United States Patent [19]

Carevic et al.

[11] Patent Number: 5,326,434

[45] Date of Patent: Jul. 5, 1994

[54] CREPING ADHESIVE FORMULATION

[75] Inventors: Frank E. Carevic, West Chester; Gregory J. Rose, Kennett Square, both of Pa.

[73] Assignee: Scott Paper Company, Philadelphia, Pa.

[21] Appl. No.: 60,178

[22] Filed: May 7, 1993

[51] Int. Cl.⁵ .............................................. B31F 1/12
[52] U.S. Cl. .................................... 162/111; 162/112; 264/281
[58] Field of Search ................. 162/111, 112; 264/281

[56] References Cited

U.S. PATENT DOCUMENTS

| | | | |
|---|---|---|---|
| 3,301,746 | 1/1967 | Sanford et al. | 162/111 |
| 3,926,716 | 12/1975 | Bates | 162/111 |
| 4,063,995 | 12/1977 | Grossman | 162/111 |
| 4,304,625 | 12/1981 | Grube et al. | 162/111 |
| 4,883,564 | 11/1989 | Chen et al. | 162/111 |
| 5,187,219 | 2/1993 | Furman | 162/112 |
| 5,246,544 | 9/1993 | Hollenberg et al. | 162/111 |

Primary Examiner—Peter Chin
Attorney, Agent, or Firm—John A. Weygandt; John W. Kane, Jr.

[57] ABSTRACT

Addition of a polyhydric alcohol to creping adhesive formulation comprising a water soluble binder increases operational efficiency.

5 Claims, No Drawings

CREPING ADHESIVE FORMULATION

BACKGROUND OF THE INVENTION

1. Field of the Invention

This invention relates to the manufacture of soft, absorbent tissue paper webs and particularly to formulations for creping such webs to obtain improved softness in the web while increasing operational efficiency.

2. Description of the Related Art

The creping of paper webs by removing them from a heated surface, usually a rotating drum, with a doctor blade to impart softness to the web is well known in the art. The benefits and difficulties encountered in such a process have been extensively discussed in the prior art, notably, Grossman, U.S. Pat. No. 4,063,995, issued Dec. 20, 1977. The creping process depends upon controlling the adhesion of the web to the heated surface. Many adhesive formulations have heretofore been proposed. The present invention relates to creping adhesives which are applied to the creping drum, and more particularly to formulations comprising a water-soluble adhesive. See for example Grube et al, U.S. Pat. No. 4,304,625, issued Dec. 8, 1981, wherein the water soluble component is polyvinyl alcohol. The creping adhesive tends to coat the dryer with a hard and uneven film which builds up as drying and creping proceed, resulting in uneven creping and rapid wear of the creping blade itself. See Grube et al at Col. 2, lines 25-30. In many cases, a cleaning blade is used to scrape the film from the drum surface. These cleaning blades must be changed frequently. Additionally, they cause creping surface wear.

It has further been found that the addition of a phosphate salt to the creping adhesive formulation greatly reduces the problem of the hard film build-up on the creping surface. Chen et al, U.S. Pat. No. 4,883,564 issued Nov. 28, 1989. While the addition of a phosphate salt to the formulation reduced the need for changing blades and resulted in more even creping, practitioners have continued to desire greater heat stability of the creping adhesive, more tolerance of moisture variations in the paper web, longer crepe blade life and stronger adhesion of the paper web to the creping surface.

SUMMARY OF THE INVENTION

This invention relates to the manufacture of creped tissue products, such as facial tissue, bathroom tissue (toilet paper), paper towels and the like. Such tissue products typically have a basis weight of 9 to 32 grams per square meter and are referred to hereinafter as "tissue products". In the creping process, a paper web is adhered to a rotating cylinder (Yankee drum) and removed (creped) with a doctor blade. Adhesion of the web to the rotating cylinder is generally augmented by the application of a creping adhesive to either the cylinder surface or the web itself. The present invention is concerned with forms of creping wherein the adhesive is applied to the creping surface.

More particularly, this invention relates to a manufacturing process where a moist web is carried on an open mesh conveying fabric where it is thermally dried. Thereafter it is transferred and adhered to a rotating cylindrical creping surface. This type of process is well known in the paper making art, having been described in Sanford et al, U.S. Pat. No. 3,301,746, issued 1967 and Bates, U.S. Pat. 3,926,716, issued 1975. It was Bates who identified the advantages of using particular polyvinyl alcohols in creping webs which have been dried to relatively high fiber consistencies. Useful polyvinyl alcohols are characterized by a degree of hydrolysis ranging from 80% to 99% and a viscosity as a 4% aqueous solution at 20° C. exceeding 20 centipoise. Preferably they are characterized by a degree of hydrolysis ranging from about 86% to 97%. These partially hydrolyzed polyvinyl alcohols will be referred to hereinafter as "polyvinyl alcohol", which term is used by those of ordinary skill in the creping art to denote the operable compositions commercially offered for use in the papermaking trade.

In its first aspect, the present invention resides in the use of an aqueous creping adhesive formulation containing dissolved solids which comprise a water soluble creping adhesive, for example polyvinyl alcohol, and certain polyhydric alcohols characterized in being stable at high temperatures, namely above those encountered on the creping surface. These polyhydric alcohols are taken from the group consisting of pentaerythritol, di-pentaerythritol, trimethylolpropane and di-trimethylolpropane. All of these four polyhydric alcohols are 1,3-propanediols and bear the following systematic names, respectively:

2,2-bis(hydroxymethyl)-1,3-propanediol,
2,2-[oxybis(methylene)]-bis[2-hydroxymethyl]-1,3-propanediol,
2-ethyl-2-hydroxymethyl-1,3-propanediol, and
2,2-[oxybis(methylene)]-bis[2-ethyl]-1,3-propanediol.

Typically, the creping adhesive formulation consists of from about 0.5 to 5 weight percent solids. The solids portion of the formulation comprises from about 5 to about 30 weight percent polyhydric alcohol and preferably from about 60 to 95 weight percent polyvinyl alcohol.

In its most preferred embodiment, the creping adhesive formulation further includes a phosphate salt, incorporated into the creping adhesive in an amount from 1-15% by weight of the solids content of the adhesive, as described and claimed by Chen et al, U.S. Pat. No. 4,883,564. As taught by Chen et al, particularly preferred is a potassium polyphosphate solution.

DESCRIPTION OF THE PREFERRED EMBODIMENTS

The principles, features and advantages of the invention will be further understood upon consideration of the following specific examples.

EXAMPLE 1 (The Prior Art)

A single ply tissue web was formed using a furnish of 70% northern softwood kraft and 30% eucalyptus fiber on a twin wire former utilizing a three-layer headbox with the eucalyptus pulp placed in the air side layer, i.e. the side opposite from the Yankee surface. The web was partially dried to a dryness of 78% then pressed onto a Yankee cylinder using a pressure roll on which the loading was 225 pounds per lineal inch. The Yankee creping cylinder having a diameter of 15 feet was coated with a polymer film that provides adhesion between the sheet and the cylinder surface. The polymer material was sprayed onto the cylinder surface as an aqueous solution which contained 95% by weight of a polyvinyl alcohol having a 87-88% hydrolysis and a viscosity of 22-26 centipoise, measured as a 4% solution at 20° C., and 5% by weight of a potassium polyphosphate. The spraying means applied 50 milligrams of total solids per square meter of cylinder surface. The creping cylinder was heated using saturated steam at 60 psi and the supply of hot air to the hood above the Yankee was maintained at 600° F. The Yankee cylinder speed was 3675 feet per minute. After the sheet was pressed onto the Yankee cylinder it remained in contact with the heated cylinder, reaching a temperature of 265° F. just prior to arrival at the creping blade. The creping blade was set such that the creping angle was 5° above the radial line at the point of contact. The creped sheet had a dryness of 97% when it came off the creping blade. The creped sheet was calendared to meet the desired bulk specifications prior to the reel. The Yankee speed and reel speed was set in such a way that there is a formation of 12% crepe. Sheet tightness between the crepe blade and calendar, referred to hereinafter as "tension", was measured by the force exerted on a roll instrumented with a force gauge which was calibrated to read in pounds of force.

After a period of operation the coating on the Yankee cylinder was streaky and thermally decomposed adhesive or char material (hereinafter "char") was visible on the creping blade edge. Previous operating experience has shown that the formation of char on the creping blade bevel resulted in sheet breaks shortly thereafter.

The physical properties of the paper produced are given in tabular form below, wherein "BW" stands for Basis Weight and is stated in grams per square meter, "Bulk" is the thickness of 10 plies stated in millimeters, "MDT" stands for machine direction tensile strength, expressed in grams per inch, "MDS" stands for machine direction stretch in percent, "CDT" stands for cross direction tensile strength, expressed in grams per inch, "CDS" stands for cross direction stretch in percent and "Sheet Tension", as mentioned above, is given in pounds.

| BW | BULK | MDT | MDS | CDT | CDS | SHEET TENSION |
|---|---|---|---|---|---|---|
| 28.0 | 2.49 | 563.7 | 18.9 | 227.9 | 7.16 | 1.65 |

In the following Examples 2-8, the machine and all other conditions were the same as in Example 1 unless otherwise noted. The creping adhesive formulation was applied at 50 milligrams solids per square meter of Yankee cylinder surface. The physical properties of the sheet are expressed in the same units as in Example 1.

EXAMPLE 2

The adhesive formulation was changed by substituting 5% pentaerythritol by weight for the polyphosphate. The web was partially dried to 79.1% before transfer to the Yankee cylinder. The coating on the Yankee cylinder was lighter and more uniform than Example 1. The creping blade bevel was free of char.

The physical properties of the sheet were as follows:

| BW | BULK | MDT | MDS | CDT | CDS | SHEET TENSION |
|---|---|---|---|---|---|---|
| 26.9 | 2.56 | 625.4 | 19.4 | 263.4 | 6.6 | 1.24 |

EXAMPLE 3

The adhesive formulation was changed to 80% polyvinyl alcohol of the same composition as in Example 1 and 20% pentaerythritol by weight. Yankee cylinder coating was more streaky than in Example 2. Blade bevel was free of char.

The physical properties of the sheet were as follows:

| BW | BULK | MDT | MDS | CDT | CDS | SHEET TENSION |
|---|---|---|---|---|---|---|
| 27.3 | 2.45 | 638.0 | 19.3 | 258.9 | 7.2 | 1.25 |

EXAMPLE 4

The adhesive formulation was changed to 70% polyvinyl alcohol of the same composition as in Example 1 and 30% pentaerythritol by weight. Yankee and creping blade conditions were the same as in Example 3.

The physical properties of the sheet were as follows:

| BW | BULK | MDT | MDS | CDT | CDS | SHEET TENSION |
|---|---|---|---|---|---|---|
| 27.7 | 2.45 | 657.8 | 19.6 | 256.2 | 6.8 | 1.23 |

EXAMPLE 5

The adhesive formulation was changed to 88% polyvinyl alcohol of the same composition as in Example 1, 10% pentaerythritol, and 2% potassium polyphosphate by weight. The coating on the Yankee cylinder was light and uniform, with no char on the creping blade. Sheet tension increased with the addition of the potassium polyphosphate.

The physical properties of the sheet were as follows:

| BW | BULK | MDT | MDS | CDT | CDS | SHEET TENSION |
|---|---|---|---|---|---|---|
| 26.9 | 2.48 | 652.0 | 18.9 | 257.4 | 6.9 | 1.47 |

EXAMPLE 6

The adhesive formulation was changed to 86% of the same polyvinyl alcohol as used in Example 1, 10% pentaerythritol, and 4% potassium polyphosphate by weight. The coating on the Yankee cylinder was light and uniform, with no char on the creping blade. As may be seen by comparison to Example 5, increasing the amount of potassium phosphate from 2% to 4% increased the sheet tension significantly.

The physical properties of the sheet were as follows:

| BW | BULK | MDT | MDS | CDT | CDS | SHEET TENSION |
|---|---|---|---|---|---|---|
| 27.1 | 2.47 | 586.5 | 19.0 | 230.8 | 8.5 | 1.63 |

EXAMPLE 7

The adhesive formulation was changed to 85% of the same polyvinyl alcohol as used in Example 1, 10% pentaerythritol, and 5% potassium polyphosphate by weight. The coating on the Yankee cylinder was light and uniform, with no char on the creping blade. Again, increasing the level of potassium polyphosphate produced a further increase in sheet tension.

The physical properties of the sheet were as follows:

| BW | BULK | MDT | MDS | CDT | CDS | SHEET TENSION |
|---|---|---|---|---|---|---|
| 27.4 | 2.41 | 565.0 | 19.9 | 217.7 | 7.7 | 1.69 |

EXAMPLE 8

The adhesive formulation was changed to 75% of the same polyvinyl alcohol as used in Example 1, 20% pentaerythritol, and 5% potassium polyphosphate by weight. The crepe quality at this condition was not as uniform as previous conditions, although the yankee cylinder surface and creping blade condition were similar to Example 7.

The physical properties of the sheet were as follows:

| BW | BULK | MDT | MDS | CDT | CDS | SHEET TENSION |
|---|---|---|---|---|---|---|
| 27.1 | 2.45 | 525.7 | 18.8 | 205.7 | 7.2 | 1.67 |

EXAMPLE 9 (The Prior Art)

Two single-ply tissue webs were formed on a twin wire former from a three-layer headbox with a furnish of 75% Northern softwood kraft and 25% eucalyptus fibers in the layer contacting the Yankee cylinder and 100% Northern softwood kraft in the mid and air-side layers. The web was partially dried to a dryness of 85%, then pressed onto a Yankee cylinder using a pressure roll on which the loading was 225 pounds per lineal inch. The Yankee cylinder having a diameter of 15 feet was coated with an adhesive formulation consisting of 95% of the same polyvinyl alcohol as used in Example 1 and 5% potassium polyphosphate. The aqueous solution was sprayed onto the Yankee cylinder surface at a rate of 50 milligrams of total solids per square meter of cylinder surface. The Yankee cylinder was heated using saturated steam at 50 psi and the supply of hot air to the hood above the Yankee cylinder was maintained at 600° F. The Yankee cylinder speed was 3500 feet per minute. After the sheet was pressed onto the Yankee cylinder, it remained in contact with the heated cylinder, reaching a temperature of 268° F. just prior to arrival at the creping blade. The creping blade was set such that the creping angle was 5° above the radial line at the point of contact. The creped sheet had a dryness of 99% when it came off the creping blade. The creped sheet was calendared to meet the desired bulk specification prior to the reel. The Yankee speed and reel speed were set in such a way that there was a formation of 6% crepe.

The coating on the Yankee cylinder surface was streaked and non-uniform after about 3 hours of operation, while the creping blade bevel had some char attached.

Physical properties of the two individual sheets appear below. In this and the following examples, the single figure appearing under "Sheet Tension" is applicable to both sheets as they were made in immediate succession on the same machine.

| BW | BULK | MDT | MDS | CDT | CDS | SHEET TENSION |
|---|---|---|---|---|---|---|
| 17.3 | 2.67 | 245.6 | 17.2 | 103.1 | 8.8 | 0.77 |
| 16.8 | 2.49 | 242.2 | 16.8 | 99.6 | 8.0 | |

In the following Examples 10-14, the creping adhesive formulation was applied at 50 milligrams solids per square meter of Yankee cylinder surface. Except as noted, all other conditions were the same as previously described in Example 9.

EXAMPLE 10

The adhesive was changed to 85% of the same polyvinyl alcohol as used in Example 1, 10% pentaerythritol, and 5% potassium polyphosphate.

The Yankee surface was more uniform and less streaky and the creping blade was free of char. Sheet tension also increased.

Individual sheet physical properties were as follows:

| BW | BULK | MDT | MDS | CDT | CDS | SHEET TENSION |
|---|---|---|---|---|---|---|
| 16.9 | 2.60 | 234.8 | 15.8 | 93.0 | 10.3 | 0.86 |
| 17.0 | 2.55 | 240.7 | 15.9 | 98.4 | 10.0 | |

EXAMPLE 11

The adhesive was changed to 100% of a 95.5-96.5% hydrolyzed polyvinyl alcohol with a 4% solution viscosity of 25-29 centipoise at 20° C. The sheet was adhered to the Yankee cylinder after partial drying to 83.7% solids. The coating on the Yankee cylinder was not uniform and very streaky, while the creping blade bevel had char on the edge.

This sheet was considered unsatisfactory for bonding into a two-ply web. The physical properties for the single sheet were as follows:

| BW | BULK | MDT | MDS | CDT | CDS | SHEET TENSION |
|---|---|---|---|---|---|---|
| 17.5 | 2.53 | 291.5 | 14.7 | 108.7 | 8.3 | .57 |

EXAMPLE 12

The adhesive was changed to 95% of the same polyvinyl alcohol as used in Example 11, and 5% potassium polyphosphate. The coating on the Yankee cylinder was non-uniform and streaky. The blade bevel contained a lot of rough char accumulation.

The physical properties of the sheets were as follows:

| BW | BULK | MDT | MDS | CDT | CDS | SHEET TENSION |
|---|---|---|---|---|---|---|
| 16.6 | 2.43 | 381.5 | 15.3 | 133.7 | 8.7 | 0.51 |
| 16.6 | 2.40 | 370.4 | 15.6 | 135.4 | 7.9 | |

EXAMPLE 13

The adhesive was changed to 85% of the same polyvinyl alcohol as used in Example 11, 10% pentaerythritol, and 5% potassium polyphosphate. Coating uniformity was much better than in Examples 11 and 12, and the level of blade contamination from char was lower. Notably, the sheet tension in this Example was significantly higher than in Example 12, even though they both utilized 5% potassium polyphosphate, suggesting a synergistic reaction between the pentaerythritol and the polyphosphate.

The physical properties of the sheets were as follows:

| BW | BULK | MDT | MDS | CDT | CDS | SHEET TENSION |
|---|---|---|---|---|---|---|
| 16.6 | 2.47 | 350.0 | 15.6 | 121.8 | 8.0 | .750 |
| 16.6 | 2.44 | 329.7 | 15.0 | 124.8 | 8.0 | |

EXAMPLE 14

The adhesive was changed to 95% of the same polyvinyl alcohol as used in Example 1 and 5% trimethylolpropane. Uniformity of the coating on the cylinder surface was better than any of the formulations containing neither pentaerythritol nor trimethylolpropane, namely, Examples 1, 9, 11 and 12, and the creping blade showed no contamination.

The physical properties of the sheets were as follows:

| BW | BULK | MDT | MDS | CDT | CDS | SHEET TENSION |
|---|---|---|---|---|---|---|
| 17.0 | 2.52 | 314.2 | 14.9 | 118.6 | 8.8 | 0.80 |
| 17.3 | 2.48 | 292.7 | 15.0 | 124.0 | 7.2 | |

Although the invention has been described with reference to preferred embodiments thereof, it is to be understood that various changes may be resorted to by one skilled in the art without departing from the spirit and scope of the invention as defined by the appended claims.

What is claimed is:

1. In a process of treating a paper web by applying an adhesive formulation to a creping surface and creping the web from said surface, the improvement which consists of employing an adhesive formulation comprising polyvinyl alcohol in an amount of at least about 60% and a polyhydric alcohol taken from the group consisting of pentaerythritol, di-pentaerythritol, trimethylolpropane and di-trimethylolpropane said polyhydric alcohol being present in an amount from about 5% to about 30% by weight of the solids content of the adhesive.

2. The process in accordance with claim 1 wherein the adhesive formulation further includes potassium polyphosphate in an amount of at least about 1%.

3. The process in accordance with claim 1 wherein the polyhydric alcohol is pentaerythritol.

4. The process in accordance with claim 2 wherein the polyhydric alcohol is pentaerythritol.

5. The process in accordance with claim 1 wherein the polyhydric alcohol is trimethylolpropane.

* * * * *